US010451400B2

(12) United States Patent
Ruck et al.

(10) Patent No.: US 10,451,400 B2
(45) Date of Patent: Oct. 22, 2019

(54) MACHINE AND METHOD FOR MONITORING A COORDINATE MEASURING DEVICE

(71) Applicant: Carl Zeiss Industrielle Messtechnik GmbH, Oberkochen (DE)

(72) Inventors: Otto Ruck, Pfahlheim (DE); Peter Uhl, Unterschneidheim (DE)

(73) Assignee: CARL ZEISS INDUSTRIELLE MESSTECHNIK GMBH, Oberkochen (DE)

( * ) Notice: Subject to any disclaimer, the term of this patent is extended or adjusted under 35 U.S.C. 154(b) by 120 days.

(21) Appl. No.: 15/621,276

(22) Filed: Jun. 13, 2017

(65) Prior Publication Data
US 2017/0276468 A1 Sep. 28, 2017

Related U.S. Application Data

(63) Continuation of application No. PCT/EP2015/080217, filed on Dec. 17, 2015.

(30) Foreign Application Priority Data

Dec. 19, 2014 (DE) .................. 10 2014 226 691

(51) Int. Cl.
*G01B 7/008* (2006.01)
*F16P 3/14* (2006.01)
(Continued)

(52) U.S. Cl.
CPC .............. *G01B 7/008* (2013.01); *F16P 3/142* (2013.01); *G01B 5/008* (2013.01); *G01B 21/04* (2013.01); *G01B 21/045* (2013.01)

(58) Field of Classification Search
CPC ........ G01B 7/008; G01B 5/008; G01B 21/04; G01B 21/045; F16P 3/142
(Continued)

(56) References Cited

U.S. PATENT DOCUMENTS 5,465,221 A * 11/1995 Merat et al. ..... G05B 19/41875
702/83
6,841,780 B2   1/2005 Cofer et al.
(Continued)

FOREIGN PATENT DOCUMENTS

DE    199 38 639 A1   2/2001
DE    100 26 710 A1   12/2001
(Continued)

*Primary Examiner* — Paul M. West
(74) *Attorney, Agent, or Firm* — Harness, Dickey & Pierce, P.L.C.

(57) ABSTRACT

A method for monitoring a coordinate-measuring machine (CMM), having a monitoring device which is set up to monitor at least one location region of the CMM, in which a movable part of the CMM is movable, wherein the method includes:
monitoring the at least one location region with the monitoring device, wherein the monitored location region is variable in terms of its size,
ascertaining the position of the movable part of the CMM relative to a fixed position associated with the location region and/or ascertaining the movement of the movable part relative to the fixed position, and
setting or varying the size of the monitored location region in dependence on the position and/or the movement of the movable part relative to the fixed position.

16 Claims, 3 Drawing Sheets

(51) Int. Cl.
*G01B 5/008* (2006.01)
*G01B 21/04* (2006.01)

(58) Field of Classification Search
USPC .................. 73/1.79; 100/99, 341, 348, 349;
192/129 R, 130
See application file for complete search history.

(56) References Cited

U.S. PATENT DOCUMENTS

| | | | |
|---|---|---|---|
| 7,783,386 B2* | 8/2010 | Merte et al. | F16P 3/141 700/255 |
| 2002/0180393 A1* | 12/2002 | Slater et al. | B25J 9/023 318/568.11 |
| 2003/0047672 A1 | 3/2003 | Henkel et al. | |
| 2003/0076224 A1 | 4/2003 | Braune | |
| 2004/0234025 A1 | 11/2004 | Schroeder et al. | |
| 2005/0207618 A1 | 9/2005 | Wohler et al. | |
| 2006/0049939 A1 | 3/2006 | Haberer et al. | |
| 2008/0033690 A1 | 2/2008 | Grupp | |
| 2008/0285710 A1 | 11/2008 | Schroeder et al. | |
| 2013/0201292 A1* | 8/2013 | Walter et al. | F16P 3/14 348/47 |
| 2014/0277723 A1 | 9/2014 | Nishimura et al. | |

FOREIGN PATENT DOCUMENTS

| | | |
|---|---|---|
| DE | 100 33 608 A1 | 2/2002 |
| DE | 10 2007 007 576 B4 | 1/2009 |
| DE | 10 2012 103 627 A1 | 10/2012 |
| DE | 10 2014 202 977 A1 | 8/2015 |
| EP | 2 685 150 A1 | 1/2014 |
| EP | 2 783 797 A2 | 10/2014 |
| WO | 2007/085330 A1 | 8/2007 |

\* cited by examiner

MACHINE AND METHOD FOR MONITORING A COORDINATE MEASURING DEVICE

CROSS-REFERENCES TO RELATED APPLICATIONS

This application is a continuation of international patent application PCT/EP2015/080217, filed on Dec. 17, 2015 designating the U.S., which international patent application has been published in German language and claims priority from German patent application 10 2014 226 691.2, filed on Dec. 19, 2014. The entire contents of these applications are incorporated herein by reference.

BACKGROUND OF THE INVENTION

The present invention relates to a method for monitoring a coordinate-measuring machine and to a coordinate-measuring machine with which the method may be performed.

Modern coordinate-measuring devices use high movement speeds, for example of gantries, so that the measurement performance can be continuously increased. In the process, correspondingly high kinetic energies of moving parts occur, as a result of which the risk of injury to persons, such as operating staff, increases if the machine is intended to remain freely accessible.

It is not always possible to observe the regularly decreasing limit values of the permissible energies due to a reduction in the mass of moving parts. Due to the increasing speeds of moving parts, it is also no longer possible, as with low speeds, to take the available escape option of persons in the case of risk into account in the risk analysis. The only acceptable possibility of solving this problem is to keep the person away from the device or to move the device at only a low speed if persons are present within the danger region.

In machine tools or robots, cost-effective solutions that are typically used are mechanical barriers or cabins for keeping a safe distance between persons and device. If a person must enter the danger region, the relevant devices are shut down to prevent any risk, because these devices can never be entirely safe, even at slow movements, due to their high driving forces.

It is possible to reduce the driving force in small and medium-sized coordinate-measuring machines of portal and horizontal-arm construction such that the risk of injury is reduced and persons can work at the device while the machine is moving. This mode of operation is crucial in metrology, because the presence of the operators at the measuring machine is frequently necessary in the teach-in phase for workpieces or in the case of manual measurements.

In addition to many other solutions for securing a danger region, cameras are used in the prior art.

DE 199 38 639 A1 relates to an apparatus for securing a danger region, in particular the danger region of a device which operates in automated fashion. The apparatus has means for producing an optically monitored virtual barrier and means for producing a switching signal for stopping the device if the barrier is breached. The first means have an image recording unit and a defined target of which the image recording unit records an image. The second means have a comparison unit that compares the recorded image to a variable that is characteristic of a reference image.

DE 100 26 710 A1 relates to an optoelectronic protection device having at least one camera for recording images of a protection region and an evaluation unit, associated therewith, for processing the recorded images and for triggering a reaction in dependence on a detected event. Furthermore provided is at least one radiation source associated with the camera and at least one reflector which limits the protection region.

A disadvantage of these safety installations is that an entire device is considered to be dangerous over the entire movement range of movable parts. If a safety installation is triggered, the device is still slowed down or even shut down, even if this is not necessary in the current situation.

One object of the present invention is that of specifying a solution to this problem. The intention is in particular to specify a method for monitoring a coordinate-measuring machine with which this problem can be solved.

SUMMARY OF THE INVENTION

According to a fundamental idea of the invention, a monitored location region, which is a potential danger region, is varied or configured to be variable in terms of its size. The size of the location region is adapted to the relative position and/or the movement of a movable part of a coordinate-measuring machine (CMM below), in particular a displaceable portal, relative to the location region, in particular how far a movable part is away from the location region. In other words, the size of the monitored location region is controlled in dependence on the relative position and/or the movement, in particular the movement direction, acceleration and/or movement speed, of the movable part relative to the location region. If the movable part is positioned near the location region, the size of the monitored location region, which may be a surface region or a volume region, can be increased, for example. If the movable part is situated at a position which is relatively remote from the location region, the size of the monitored location region can be decreased, for example. The position of the movable part relative to the location region can be established with respect to what is known as a fixed position that is associated with the location region. The fixed position is a reference for determining the position and/or the movement relative to the location region. It is possible to establish the position and/or the movement of the movable part of the CMM relative to the fixed position that is invariable in terms of its orientation. The fixed position can be given, for example, in spatial coordinates within a coordinate system of the CMM (machine coordinate system). The fixed position can be situated within the location region, which is variable in terms of size, or outside of it, but is preferably situated at least near the location region. The fixed position serves for the unique determination of the relative position and/or movement of the movable part of the CMM relative to the spatial region that is or is to be monitored. The fixed position is in particular identified by way of a geometric feature. The fixed position can be identified by way of a mark, wherein the mark can also be capturable or detectable in a multitude of ways, for example optically.

Due to the fact that the size of the location region or danger region is variable, it is possible to establish or determine a current danger region that is to be monitored. Other regions that are situated outside a current danger region can be at least partially or entirely neglected or omitted during monitoring, or smaller spaces thereof can be monitored. These other regions are for example regions that are at least for a time at a sufficient distance from the movable part of the CMM and then do not need to be monitored or of which at least a smaller space or smaller area can be monitored. A current danger region is in particular a region in the direct vicinity of the movable part of the CMM. This is the region with the highest risk of injury for persons. In location regions that are more remote from movable parts, there is no danger or less danger for persons, since the distance from the movable part is sufficiently great.

In the solution according to the invention, not the entire movement region of a movable part of the CMM is considered to be dangerous and monitored, but, as mentioned before, the size of the monitored region is selected in dependence on the position and/or the movement of the movable part relative to the region or relative to a fixed position that is associated with the region. This solution also has the advantage that the size of observed regions can be minimized, in particular to only the current danger regions. As a result, any occurring amount of data will be minimized during monitoring.

According to a further fundamental idea of the invention, it will be ascertained, for example using a monitoring device which is yet to be described, whether a person is situated in the monitored location region. The distance of the movable part of the CMM from the location region can be ascertained and/or a movement of the movable part relative to the location region can be ascertained. Furthermore, the movement, in particular the movement speed and/or acceleration, of the movable part can be controlled in dependence on the distance and/or the movement of the movable part relative to the location region if the presence of a person in the monitored location region is ascertained. The distance and/or the movement of the movable part relative to the location region can be determined on the basis of an already mentioned fixed point. This invention idea is an independent solution, but can also be combined with the previous idea, in which the size of the monitored location region is varied depending on the position and/or the movement of the movable part relative to the location region, in particular to the fixed point. What is recognized with this idea of the invention is whether persons are situated in the current danger region of the device. If this is the case, the speed of a movable part can be limited to a maximum permissible value, or the movement of the movable part can be stopped.

With the present invention, depending on the embodiment, one or more of the following advantages are attained:

Existing elements of a CMM can be used for the method according to the invention, such as in particular an existing controller and/or an existing computational unit, also referred to as evaluation computer. In particular, a controller and/or a computational unit can be used as part of the monitoring device, in particular for monitoring a location region of variable size and/or for monitoring whether a person or an object is present in a monitored location region. A reduction in data and thus associated savings can be attained by using an already existing computational unit of the CMM. Data of a monitoring device, for example image data of at least one camera, can be prepared for reducing the amount of data. A reduction in data is advantageous if the data is intended to be processed in real time. A reduction in data can be effected using evaluation algorithms or checksums, in particular in the case of image data. By using already existing components of a CMM, a cost-effective solution for monitoring the CMM can be obtained.

The method according to the invention can be an additional method for controlling a speed of movable parts of the CMM, in addition to further safety devices or security mechanisms of the CMM. A CMM can already have devices for monitoring the speed and for limiting the force of movable parts, with which devices it is possible to ensure that the CMM or the movable parts thereof may be operated safely at low speed. The method according to the invention may be added, with which a movement of a movable part can additionally be controlled. It is possible with the method according to the invention for a speed to be controlled or set above said low speed, which may also be referred to as minimum speed. As will be explained in this description, a speed can be set to maximum speed, or at least to a greater speed, if for example a movable part has a minimum distance relative to a location region, even if the presence of a person is determined in the monitored location region, which is additionally variable in terms of its size. Due to the method according to the invention, a dynamic monitoring method with a greater range of permissible speed is therefore provided.

In particular, the invention specifies a method for monitoring a CMM, wherein a coordinate-measuring machine is used which has a monitoring device set up for monitoring at least one location region of the CMM in which a movable part of the CMM is movable, with the method including:

monitoring the at least one location region with the monitoring device, wherein the monitored location region is variable in terms of its size, ascertaining the position of the movable part of the CMM relative to a fixed position associated with the location region and/or ascertaining the movement of the movable part relative to the fixed position, setting or varying the size of the monitored location region in dependence on the position and/or the movement of the movable part relative to the fixed position.

The movable part of the CMM can be a translatable and/or rotatable part, in particular a displaceable or pivotable part. The movable part is in particular a part of a measurement system of the CMM. The movable part is preferably a movable portal, a movable bridge or a movable arm. The CMM is for example a CMM of portal construction, a CMM of gantry construction, or a CMM of horizontal-arm construction.

When ascertaining the position of the movable part, the distance of the movable part relative to the fixed position can be ascertained. When ascertaining the movement, in particular the movement direction, the movement speed and/or the acceleration can be ascertained.

The fixed position can be a virtual position which is determinable within a coordinate system, in particular a machine coordinate system of the CMM, preferably determinable with respect to at least one location coordinate. The fixed position can be marked by way of identifying means, for example visually marked. For example, the fixed position is a position of a target structure (which will be described below) that can be part of a monitoring device.

An example of a monitoring device that may be used for the method is described in detail elsewhere in this description by way of a coordinate-measuring machine according to the invention. The monitoring device preferably has at least one image recording unit with which the at least one location region may be monitored. A camera is an example of an image recording unit. The image recording unit can be used to monitor a location region of variable size in various ways. For example, the image section that is monitored with the image recording unit can be set to or adapted to a desired size, or in another variant, a section of a recorded image can be monitored and/or evaluated. Such evaluation of an image section can be effected with a computational unit. The computational unit can evaluate observed regions of an image that correspond to the size of a location region to be monitored.

In one variant of the method, provision is made for the size of the monitored location region to be decreased as the distance of the movable part from the fixed position increases, wherein a decrease of the monitored location region to zero can take place, or the size of the monitored location region is increased as the distance of the movable part from the fixed position decreases. What is taken into account in this variant is that, with increasing distance of the movable part of the CMM, the risk to persons is reduced. Accordingly, the size of the location region to be monitored decreases with increasing distance of the movable part from the fixed position that is associated with the location region. In the extreme case, a location region no longer needs to be monitored at all, and it can be decreased to zero. Reducing the monitored location region to zero can mean that, although still present in principle, a location region is no longer monitored. Conversely, the size of the monitored location region can be increased with decreasing distance of the movable part from the fixed position that is associated with the location region. This takes into account the fact that, with decreasing distance of the movable part, the risk of collision with a person is increased.

When setting the size of the monitored location region, parts of the location region can be marked as not relevant for the evaluation if they are blocked for persons and therefore do not need to be monitored. Blocking of persons can be effected for example by way of rear walls or other mechanical protection devices that are arranged next to the CMM. An example of a further region which is inaccessible and can be omitted in the monitoring is the region of installation parts, in particular installation parts having an installation location which is variable in principle, for example a probe change magazine.

In one embodiment of the method, the method includes:
ascertaining with the monitoring device whether a person or an object is present in the monitored location region,
controlling a movement of the movable part in dependence on the position and/or the movement of the movable part relative to the fixed position if the presence of a person or an object in the monitored location region is ascertained.

According to the idea of this embodiment, it is possible, with sufficient distance of the movable part from a location region, for the movement, in particular the movement speed, of the movable part to remain uninfluenced, in particular the movement speed or acceleration to be at a maximum, even if the presence of a person in the location region is ascertained. In particular, the movement speed of the movable part is lowered, in the extreme case to zero, if the movable part approaches the location region, because in this case, the risk of collision with a person situated in the location region increases. The movement speed or acceleration can be continuously varied or varied in discrete steps, for example it is possible to select between a maximum speed of the movable part and one or more speeds that are reduced as compared to the maximum speed, or to adjust to those speeds.

The term "movement" can comprise in particular the following variables individually and in any desired combination: movement speed, movement direction and/or acceleration.

During the movement of the movable part, in particular the movement direction, the movement speed and/or the acceleration of the movable part can be taken into account. Accordingly, when controlling the movement, it is possible to control in particular: the movement direction, the movement speed and/or the acceleration.

The monitoring device can have, as already mentioned, an image recording unit. It is possible by way of image analysis to ascertain whether a person or an object is present in the monitored location region. In addition, as will be explained below with reference to a CMM according to the invention, a target structure may be present, the image of which may be recorded by the image recording unit. It is possible to ascertain whether the target structure in the image of the image recording unit is changed if a change in the target structure takes place in the image, for example if a target structure moves or the target structure is at least partially concealed by a person or an object.

In one embodiment, a method is specified including:
monitoring at least a side region of a base of the CMM and at least one placement region of the base, in which a workpiece may be placed, wherein the side region and the placement region are part of the location region if the location region is of a corresponding size,
controlling a movement of the movable part in dependence on whether the presence of a person or of an object in the placement region and/or in the side region has been ascertained.

The terms base and measurement table are used synonymously here.

In a special variant, the movement speed of the movable part is reduced if the presence of a person or of an object in the side region has been ascertained.

The term "controlling the movement" also comprises controlling the movement speed to zero, which corresponds to stopping the movement of the movable part.

The side region of a base of the CMM is for example the side region of a measurement table (also referred to as base), in particular a volume region which is laterally spaced apart from a measurement table or laterally adjoins it. The measurement table is, for example, a stone plate that typically has a great thickness and corresponding side faces. The placement region is in particular a surface section on the measurement table or a volume region above the measurement table. A first side region can be arranged for example at a first end of the measurement table. A second side region can be arranged at a second end of the measurement table. The first end is located in particular at a first transverse side of the measurement table, the second end of the measurement table at a second transverse side. In particular, a first end of the measurement table is situated at a first end of the movement path of the portal, and a second end is situated at a second, opposite end of the movement path of the portal. A third side region can be located at a first longitudinal side along which in particular a portal moves, a fourth side region can be located along the second longitudinal side of the measurement table which is opposite the first longitudinal side and along which in particular the portal likewise moves.

The measurement table can furthermore have a plurality of placement regions, such as for example a first placement region which neighbors in particular the first side region, a second placement region which neighbors in particular the second side region of the base. In particular, a side region and a placement region, which neighbor each other or adjoin each other, are associated with a location region and encompassed by the location region if the latter has a corresponding size. In this embodiment it is possible to differentiate whether the presence of a person or of an object is ascertained in the placement region or the side region, which preferably neighbor each other. For example, it is possible for a workpiece to be located in the placement region, which is not a problem in terms of a set of collision problems with a movable part of the CMM, because the presence of the workpiece is desired and known. Irrespective of this, a person may be present in a side region which preferably neighbors the placement region, which in the case of a movement of the movable part in the vicinity of the person or having a specific speed in the direction of the person could result in a collision risk. By ascertaining that there is a person in the side region, the movement of the movable part can be controlled, in particular, the movement speed can be reduced. If, in contrast, no person is located in the side region, but there is merely a workpiece in the placement region, intervention in the movement, in particular reduction in the movement speed, is not necessary.

In an embodiment of the invention, a method is specified, wherein the position and/or movement information of the movable part of the CMM are established with the monitoring device. In this embodiment, independently of a controller and computational unit of the CMM, information relating to the position and/or movement of the movable part of the CMM is established by way of the monitoring device for monitoring the location region.

The previously mentioned information relating to the position and/or movement of the movable part of the CMM can be used, for example, as follows:

In an embodiment, the established position and/or the established movement information are used to monitor the controlling of the movement of the movable part. Based on this information, it is ascertained whether a previous controlling of the movement of the movable part is done or was done correctly, i.e. results or resulted in the desired movement. If a difference between a control specification and the established position and/or the established movement information is ascertained, intervention in the movement of the movable part is possible. In particular, it is possible to effect control (again), a control (value) change or control correction. With this variant, the control can thus be monitored.

The information relating to the position and/or movement of the movable part can be compared to the information relating to the position and/or movement that has been established in the CMM itself or is known or specified.

In particular, a comparison is effected between:
the position and/or movement information established using the monitoring device, and
a position that has been established in a controller of the CMM or is specified, and/or movement information that has been established in a controller of the CMM or is specified.

The comparison involves in particular a computer or a computational unit. In an advantageous variant, a computational unit of the controller is used to effect the comparison. Alternatively or additionally, use of a monitoring device having its own computational unit is possible. A measurement computer of the CMM can likewise be involved in the comparison. If a plurality of computational units are used, for example those of a controller and those of a monitoring device, a redundant evaluation and comparison structure is created, as a result of which the reliability of the method can be increased.

The information obtained using the monitoring device can be compared to the predetermined or current values of the position and/or movement information in the controller. Movement information is in particular movement direction, speed and/or acceleration. The monitoring device in this embodiment of the method can be used as a redundant system for establishing position and/or movement information of a movable part of the CMM. It is also possible using this redundant system to check the plausibility of the movement information and/or position information relating to the movable part, as it is known from the CMM or specified. If no plausibility exists, in particular if there is a difference in the comparison, the movement of the movable part of the CMM can be influenced. In particular, the movement, more specifically the movement speed, of the movable part is controlled in dependence on a difference that was established in the above-mentioned comparison. If a difference is established, preferably the movement speed of the movable part or the acceleration thereof is reduced. In a more specific variant, the movement speed or acceleration can be changed, in particular reduced, in dependence on the magnitude of a difference between the compared variables (position and/or movement information). If a difference is established during the comparison, a signal can be transmitted to the controller of the CMM, which serves for reducing the speed of the movable part. If the comparison gives no difference, a higher speed can be selected or maintained, for example a maximum speed, for which a signal can likewise be transmitted to the controller for controlling the speed accordingly.

The position and/or movement/movement information of the movable part of the CMM can be established for example by evaluating at least a target structure (already mentioned) using an image recording unit (already mentioned). For example, at least one target structure can be arranged at the movable part of the CMM, and/or at least one target structure can image the movement path, in particular a displacement path, of the movable part or be arranged in this movement path. The relative orientation of the target structure at the movable part to the target structure in the movement path can be evaluated once or several times (in particular in time-resolved fashion). Alternatively or additionally, a size ratio of these target structures with respect to one another can be evaluated once or several times (in particular in time-resolved fashion) to establish the current position and/or movement information of the movable part. An image position of the movable part of the CMM can be established using the movement device. Information relating to the position and/or relating to the movement, such as movement direction, speed and/or acceleration, can be established using one or more image positions.

In an embodiment, a method is specified wherein the monitoring device is set up for monitoring whether a person is at a distance from the movable part that is less than a specified distance, and the movement, in particular the movement speed, of the movable part is changed in dependence on whether the distance is less than the specified distance. In this embodiment, the movable part, in addition to the already mentioned location region, is monitored using the monitoring device. In particular, a target structure, which will be explained below, can be arranged at the movable part. The target structure can be monitored using the already mentioned image recording unit. If the distance is less than the specified distance from the movable part, it is possible to establish therefrom that the target structure in the image recorded by the image recording unit is at least partially concealed by a person.

In a further aspect, the invention relates to a coordinate-measuring machine, having:
a base having side faces and a surface, which points upward, for holding a workpiece,
at least one movable part
a monitoring device, having at least one image recording unit at least one target structure, the image of which is recordable by the image recording unit, wherein the image of the target structure is variable if the target structure in the image is at least partially concealed by a person or an object, at least one comparison device that is set up to compare the recorded image to a comparison image, wherein the comparison image is an image in which no part of the target structure is concealed by a person or an object.

The CMM according to the invention can generally be set up to perform the previously mentioned methods. All features of the subject matter that have been described with reference to the previously described methods can be, individually or in any desired combination, features of the CMM according to the invention.

The coordinate-measuring machine according to the invention can furthermore have a control device that is set up to control the size of the monitored location region and/or is set up to control a movement of the movable part as per the method according to the invention that is described above.

To this end, the control device can be set up for:

controlling the size of a monitored location region, and/or controlling a movement of the movable part in dependence on a position and/or a movement of the movable part relative to a fixed position if the presence of the person or the object in the monitored location region is ascertained, and/or controlling a movement of the movable part in dependence on whether the presence of the person or of an object in a placement region of a base of the CMM and/or in the side region of a base of the CMM has been ascertained.

The above functions of the control device can be present in addition to control functions that are known for a control device of a CMM, such as for example axle drive, probing, programming the measurement sequence, controlling the measurement sequence, data capture and evaluation. This control device can be a control device of the CMM that is also set up for other known control functions of the CMM, as those mentioned above.

The CMM according to the invention can have a computational device, also referred to as a measurement computer. The computational device can fulfil, alternatively or in interaction with the controller, the above-mentioned tasks of the controller.

A CMM according to the invention has in particular one or more of the following advantages:

target structures that can be monitored with the image recording unit, such as for example patterns or stripes, are not arranged on a floor but on the CMM itself, in particular the base thereof. As a result, wear is reduced or avoided.

on account of the deliberate placement of target structures that are to be monitored, it is possible to monitor in a deliberate fashion necessary danger regions, which leads to optimum place utilization or space utilization during operation of the CMM.

monitoring-relevant regions can be selected in deliberate fashion and be combined as desired, for example using a software that is installed on a computational device of the CMM. Accordingly, targeted selection of combinations of image recording unit and target structure can be effected.

The image recording unit is in particular a camera. A plurality of image recording units are preferably arranged around the CMM. If a plurality of image recording units are used, one image recording unit may be arranged at a front end of the CMM, and a further image recording unit may be arranged at a rear end of the CMM.

If a plurality of image recording units are used, it is possible to repeatedly monitor a particularly critical position of the CMM which is accessed frequently, for example a position for a person for loading the CMM. This provides multiple redundant position monitoring.

In a variant, the information that is known from a plurality of image recording units or is established using a plurality of image recording units is compared or adjusted. With this comparison, an increase in safety is attained. In particular information from the above-mentioned position monitoring can be compared. If a location region or a specified distance of a person from a movable part is monitored by a monitoring device having a plurality of image recording units, the information provided by the various image recording units can be compared. A computational unit of a CMM controller and/or a computational unit that is part of the monitoring device can be used for the comparison.

The target structure can be a geometric feature. The target structure is in particular not identical to the movable part of the CMM. The target structure is preferably a mark. The mark can be placed on a component of the CMM, for example on a base and/or a portal. The target structure is preferably visually or optically detectable. The target structure can be for example two-dimensional, in particular in the form of a two-dimensional geometric structure. Specific examples are a stripe-shaped or line-shaped target structure.

The target structure can be attached to the CMM or to a component by way of a form-fitting, force-fitting and/or bonded connection. These variants may be combined as desired.

The target structure can have a radiation source, in particular a light source, such that radiation, in particular light, can be emitted from the target structure. In another variant, the target structure can have a retroreflective material. In yet another variant, the target structure can have a light-guiding structure. These variants may be combined as desired (and/or), also with previously described variants and those described below.

If the target structure has a radiation source, in particular a light source, this radiation source can be switchable, in particular activatable and deactivatable. By activation or deactivation, that is to say switching the radiation source of a target structure on or off, it is possible to check whether data provided by a monitoring device, in particular images, are correct, i.e. the monitored location region is correctly reproduced or imaged correctly. In correct real-type monitoring, activation/deactivation of the radiation source must be captured.

It is possible using the image recording unit, in combination with the target structure, to produce a virtual barrier. The principle of the interaction of image recording unit and target structure is also described in DE 199 38 639 A1, to which reference is made here. Said patent application also describes a comparison device. The comparison image can be stored in the comparison device or be stored externally. The comparison image can be an expected image that is compared to the current image of the target structure. If the comparison image is not recognized because, for example, a foreign object or a person is located in the image or hides a target structure in the image, an output signal can be generated with which a movement of the movable part can be controlled, in particular the speed can be reduced or the movement can be stopped.

In addition to monitoring a location region or a distance of a person from a movable part of the CMM, the at least one image recording unit can also be used for state and process monitoring of the CMM or of processors of the CMM. In a variant of a CMM according to the invention, one or more target structures are arranged at least at one side face of the base. These target structures can be used to monitor at least one side region of a base of the CMM, as explained above.

What follows is a description of where a target structure can be preferably arranged. These arrangements can be combined in any desired manner, as shown in examples.

In one embodiment, one or more target structures are arranged on the surface of the measurement table that faces upward. In this embodiment, the target structures can be used to monitor a placement region of the measurement table, as explained above.

A target structure can in particular be arranged on the surface of the measurement table that faces upwardly where typically a workpiece is arranged. Owing to a workpiece placed in the region of these target structures, the workpiece can be read using the monitoring device by way of a corresponding change in the image of the target structure. A location region around the workpiece can then be recognized as a location region to be monitored. The space around the workpiece is a space in which movable parts of the CMM, in particular of a probing system, are moved. Accordingly, it makes sense to define this space around the workpiece as the location region to be monitored. Depending on whether a workpiece is recognized with the monitoring device, a location region around the workpiece can thus be incorporated in the method for monitoring the CMM.

The target structure can be arranged in the movement path of a movable part, preferably on the measurement table, such that if the movable part moves, the target structure is partially concealed or concealed in places by the movable part. Which part of the target structure is concealed depends on the instantaneous location of the movable part of the CMM. The target structure, or at least one of a plurality of target structures, can entirely or partially image a movement path of a movable part. For example, a target structure is arranged in the movement path of a portal of a CMM.

In a still further embodiment of a CMM according to the invention, one or more target structures are arranged on the movable part, in particular on a portal. These target structures on a movable part can be used to monitor whether a person is located at a distance from the movable part that is less than a specified distance, as explained above.

BRIEF DESCRIPTION OF THE DRAWINGS

The invention is described below on the basis of exemplary embodiments. In the figures.

DETAILED DESCRIPTION OF THE PREFERRED EMBODIMENTS

Figure 1:
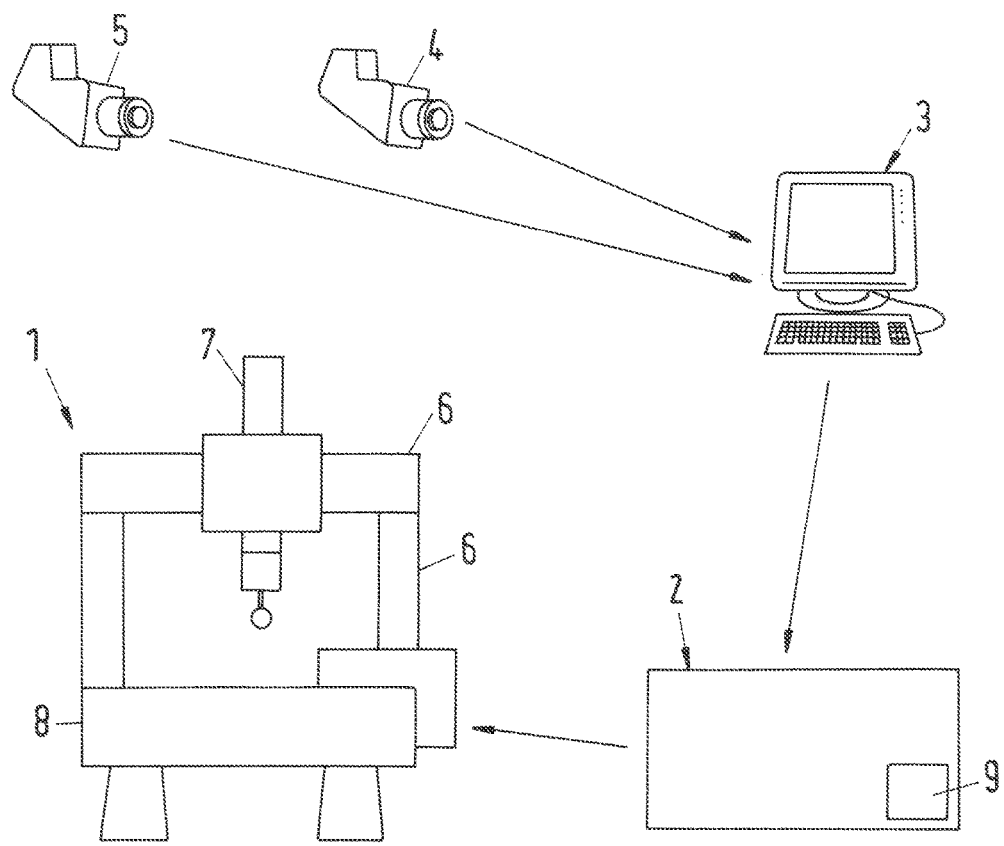
FIG. 1 shows the schematic structure of a CMM according to the invention.

In the structure according to FIG. 1, a coordinate-measuring machine 1 in portal construction is shown. The CMM 1 has the controller 2 and the measurement computer 3. Image recording units 4, 5 in the form of cameras are connected to the evaluation computer 3, for example via USB or LAN. If commercially available cameras 4, 5 are used, drivers for operating with Windows software are typically present. Using software which is easy to compile, the selection of the location regions of the CMM 1 to be transmitted or monitored can be determined, for example the cameras 4, 5 can be directed onto different location regions of the CMM, as will be explained with reference to FIGS. 2 to 4 below. The selected location regions are then transmitted to the controller 2. A total image in the form of a comparatively large location region can be transmitted, or only an image region or image section that represents a relatively smaller location region. The transmission of images or image sections of the cameras 4, 5 is effected by an existing LAN to the control device 2, which in turn controls the movement of the movable parts of the CMM 1. The movable parts of the CMM 1 present are: a portal 6 which is displaceable along the y-direction, in the viewing direction of the observer, and a ram 7. In the specific example, the movement of the portal 6 is monitored, because here is the greatest risk of collision for persons with the displaceable portal.

The CMM 1 furthermore has the base 8.

In principle, direct connection of the cameras 4, 5 to the controller 2 is also possible. However, in this variant, the number of available camera systems is limited, since the controller 2 is typically operated with a real-time operating system, for which fewer suitable camera drivers are available.

Integrated in the controller 2 is the comparison device 9 with which an image of the camera 4, 5 is compared to a comparison image, as will be explained with the following figures. The comparison device 9 can be integrated in the computer 3 rather than in the controller 2. The comparison device 9 can be realized in the form of software.

Figure 2:
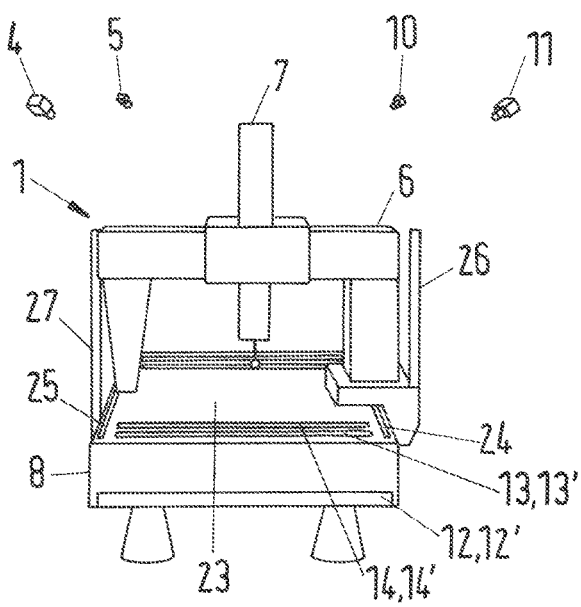
FIG. 2 shows a CMM having target structures, which is monitored on all sides using four image recording units.

In the perspective view of FIG. 2, the cameras 4, 5, 10, 11 are arranged above the CMM 1 and around the CMM. Preferably, a plurality of commercially available cameras are used, in particular if a plurality of camera units should be used according to DIN EN ISO 13849 for constructing a diversitary redundant system.

The cameras 4 and 11 observe the transverse marks 12, 13, 14 and transmit the data to the controller 2 (see FIG. 1). The controller 2 issues a release for a maximum speed (vmax) to all machine axles of the CMM 1 if the portal 6 is located in the direction y+ (displacement direction of the portal toward the rear in the viewing direction) with sufficient distance from the transverse marks 12, 13, 14. If the portal moves in the reverse direction y– toward the observer the marks 14, 13 or 12 must be uninterruptedly visible depending on the distance from the final y-orientation in order to obtain the vmax release. That means that with sufficient distance, it is also possible to move at vmax if e.g. the transverse mark 12 is interrupted by a person. Determining in this way whether a person is present in the region in front of the mark 12 is shown as step S4 in the diagram of FIG. 5. The transverse mark 12 serves for monitoring a front side region of the base 8 of the CMM. The transverse marks 13 and 14 serve for monitoring a front placement region of the base 8 and to this end are arranged on the placement surface of the base 8, that is to say on the surface of the base 8 that faces upward. The portal 6 can also be moved at vmax if, for example, the transverse marks 13 and 14 are interrupted by a workpiece that is located thereon (not illustrated here), as long as the transverse mark 12 remains visible in its full length, that is to say if no person that could collide with the portal 6 is present in the front side region of the base 8. The setting of the speed is illustrated as step S5 in the diagram of FIG. 5.

The monitoring device operates on the principle that the transverse marks 12, 13, 14 that represent target structures are observed by cameras, in the present case the cameras 4 and 11. An image of said marks 12, 13, 14 is recorded. The recorded image is changed if one of the target structures 12, 13, 14 in the image of a camera 4, 11 is at least partially concealed by a person or an object. A comparison image shows the situation where none of the marks 12, 13, 14 is concealed in this manner. The comparison image can be stored in the comparison device 9 shown in FIG. 1 or in that of the computational unit 3. A comparison can be effected accordingly in the controller 2 or the computational unit 3.

Changing the size of the monitored location region (step S3 in FIG. 5) is effected for example as follows: If the portal 6 moves in the viewing direction of the observer, only the transverse mark 14 is incorporated in the monitoring even with relatively large distance of the portal 6 from the front end of the base 8, or only the transverse mark 14 forms the monitored location region. If the portal 6 moves further in the viewing direction of the observer, the transverse mark 13 is also incorporated in the observed location region, that is to say that the size of the location region is correspondingly increased. If the movement continues, the transverse mark 12 is also incorporated, and the size of the location region is increased once again. As a result, the size of the location region increases at the front end of the base 8 the further the portal 6 moves toward the front region of the base 8. Analogous marks 12, 13, 14 can be arranged at the rear end, in the viewing direction of the observer, of the base. Accordingly, the size of a location region in the rear end of the base 8 can be decreased by way of moving the portal 6 toward the observer.

One of the marks 12, 13 or 14 can be associated with a location region at the front end of the base 8 as a fixed position. In order to differentiate the marks of the subject matter, the associated fixed position is designated with the reference sign 14', and accordingly 12' and 13'. Ascertaining the position and/or movement of the portal 6 can then be effected relative to said fixed position, for example relative to the transverse mark 14, which in this case represents a fixed position on the y-coordinate. Alternatively to the transverse mark 14, the transverse mark 12 or 13 can be used as the fixed position or another mark (not shown here) which may also be of a virtual nature, but has a fixed spatial reference with respect to the front region of the base 8 in which the front location region is defined. Ascertaining the position and/or movement of the movable part 6 relative to the fixed position 14 is designated step S2 in the flowchart of FIG. 5. Monitoring of the location region, for example in the present case the front location region at the front edge of the base 8, using the monitoring device is designated step S1 in the flowchart of FIG. 5. Monitoring of the front location region is effected, as already mentioned, with the cameras 4, 11 and the associated marks 12, 13, 14 and using the comparison unit 9 shown in FIG. 1.

Figure 3:
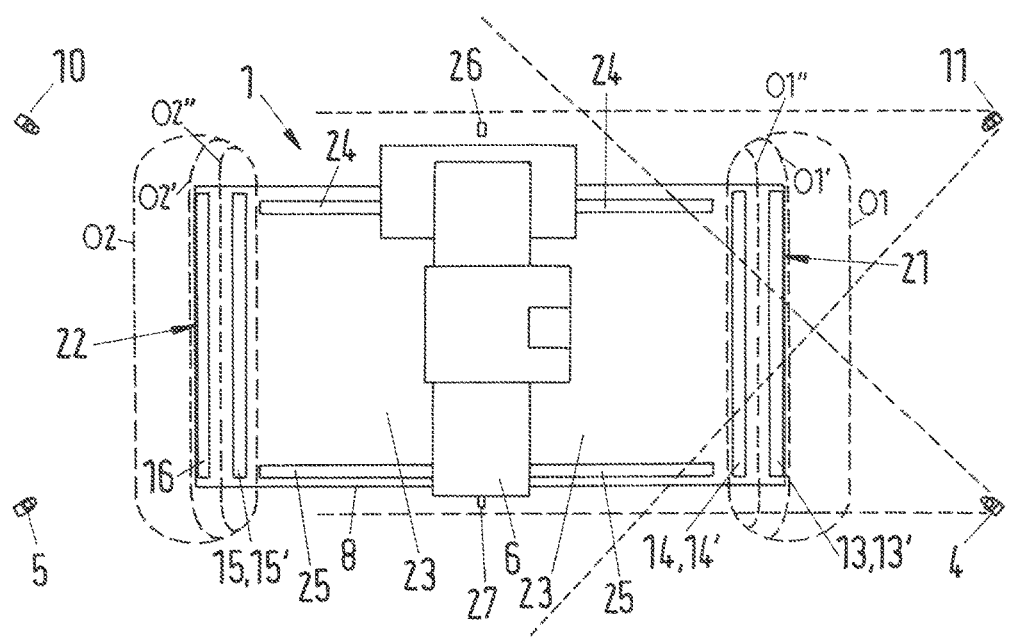
FIG. 3 shows a view of the structure of FIG. 2 from above.

In FIG. 3, the front location region O1 is delimited by way of a dashed line. Accordingly, the rear location region O2 is represented by way of a dashed line. In the rear location region O2, the position in a transverse mark 15 can be determined as a fixed position in the y-direction for ascertaining the relative orientation of the portal 6 to the location region O2.

The principle of changing the sizes of the location regions O1 or O2, which was explained above, on the basis of the location region O1 is represented by further dashed lines that surround smaller location regions O1', O1" or O2' and O2". So as to distinguish the mark 14 or 15 of the subject matter, the associated fixed position is referred to as 14' and 15'.

Figure 4:
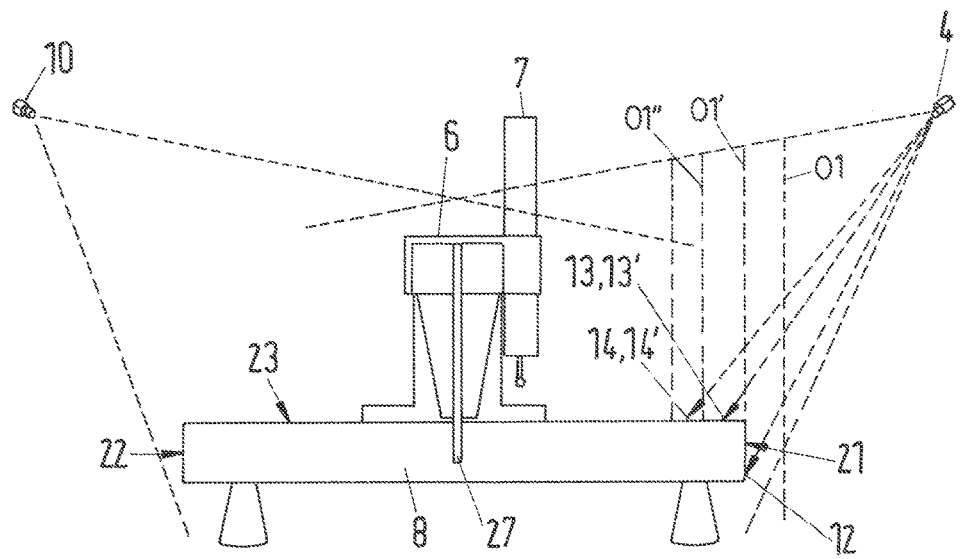
FIG. 4 shows a view of the structure of FIG. 2 from the side.

In FIG. 3, the field of view of the camera 4 and the field of view of the camera 11 are also each shown by way of dashed lines that originate from the respective cameras. The field of view for cameras 5 and 10 behaves analogously. FIG. 4 shows a side view, wherein the fields of view of the cameras 4 and 10 are shown by way of dashed lines. Furthermore shown are the lines of sight of the camera 4 to the transverse mark 14, 13 and 12.

The following text shows by way of example how setting or changing the size of the monitored location region in dependence on the position and/or the movement of the movable part relative to a fixed position may be effected.

Illustrated are: A smallest location region O1", in which only the mark 14 is evaluated, and a larger location region O1', in which not only the mark 14, but also the mark 13 are evaluated. The location region O1' comprises the location region O1". If the largest location region O1 is taken as the basis, the mark 12 at the front edge of the base 8 is also evaluated. If the portal is moved from left to right, the size of the location region O1" is initially increased to O1' and subsequently to O1, the closer the portal 6 moves to the fixed point 14' of the mark 14. As long as the portal 6 is located in the center of the measurement region, as shown in FIG. 4, the smallest location region O1" can be used as the basis, or this location region can in the extreme case even be decreased to zero. Which of the marks 12, 13, 14 are evaluated or which location region is taken as the basis, is therefore dynamically variable according to the movement of the portal. When moving the portal away from the fixed point 14", the sizes of the location regions can, in the reverse of the above-mentioned principle, be decreased in steps. In that case, if the portal 6 is located in the center or even further toward the rear edge of the base, on the left in this view, it matters not if a person is situated at the front edge, that is to say on the right in the image, next to the base, since there is currently no collision risk with the portal.

In FIGS. 3 and 4, side faces 21, 22 of the base are visible, like in FIG. 2, where the view of the observer is from the front to the side face 21. The target structure 12 is arranged on the side face 21. A side region of the base 8 is a region which spatially adjoins in this example the side face 21 and a region which spatially adjoins the side face 22, in other words, the side region is a volume region in front of the respective side face if the view of the observer is onto the side face.

In FIGS. 2 and 3, a surface 23 of the base 8 that faces upward is furthermore shown. In FIG. 3, the view of the observer is onto this surface 23. The target structures 13, 14, 15, 16 are arranged on the surface that points upward. Formed on or above the surface 23, which points upward and forms the actual measurement table surface, in this example are different placement regions of the base 8 which can be monitored each using a method according to the invention. The marks 13 and 14 form substantially a placement region at a front end of the base 8 or, in the view of FIG. 3, at a right-hand end. The marks 15 and 16 form or define a further placement region at the opposite end on the left-hand side in FIG. 3, at the rear end of the base 8 in FIG. 2.

A side region and a placement region can be part of a location region. In this example, the side region next to the side face 21, and the placement region above the marks 13 and 14 above the surface 23 that points upward are part of the location region O1. As mentioned above, the movement speed of the portal 6 can be controlled in dependence on whether the presence of a person or of an object in the placement region, that is to say above the marks 13 and 14, or in the side region, next to the mark 12, is ascertained. In particular, the speed can be influenced, in particular reduced, only if the presence of a person in the side region is ascertained, i.e. if the mark 12 on the image of the camera 4 is interrupted, which is ascertained by way of a comparison to a comparison image. In the reverse case, the speed can remain uninfluenced if a presence of a person in this side region has not been ascertained and only a workpiece in the placement region above the marks 13 and 14 has been ascertained, which can likewise be ascertained using the camera 4 by way of evaluating the marks 13 and 14, which are at least partially covered by the workpiece.

In FIGS. 2 and 3, longitudinal marks 24, 25, extending in the y-direction of the machine coordinate system, are furthermore arranged on the surface of the base 8 which points upward. Said longitudinal marks 24, 25 are used for checking the position of the portal 6 along the y-axis as compared to counter values of a position measurement system of the CMM. The monitoring device, i.e. specifically the cameras in whose field of view the longitudinal marks 24, 25 are located, evaluates a visible length of the longitudinal mark on at least one side of the portal. It is possible to determine therefrom the position of the portal in the y-direction, i.e. the displacement direction of the portal 6. If the result of the position ascertainment using the marks 24 and/or 25 does not match the position of the portal 6 that is specified by the controller 2 or has been ascertained in the controller 2, an intervention in the movement speed of the portal 6 takes place, wherein in particular the movement of the portal is slowed. In summary, it is possible using the cameras 4, 5, 10, 11 and the marks 24, 25, which are evaluated using said cameras, to ascertain a position and/or movement information of the portal 6, to subsequently carry out a comparison to a position and/or movement information from the controller 9, and to control the movement speed of the portal 6 in dependence on the result of the comparison.

In order to monitor the lateral accessibility of the CMM for persons, the bars 26, 27 are arranged on the sides of the portal. Said bars 26, 27 are likewise target structures which may be monitored using one or more cameras. In the present example, the bar 27 is captured by the cameras 4, 5, and the bar 26 is captured by the cameras 10, 11. It is hereby possible to monitor whether a person is at a distance from the portal 6 that is smaller than a specified distance. If a person laterally approaches the moving portal and in the process at least partially covers one of the marks 26, 27, the movement speed of the portal can be reduced, or the portal movement can be stopped. In order to obtain release of the maximum speed, the bar 27 must be visible to the cameras 4 and 5, and the bar 26 must be visible for the cameras 10 and 11. Due to the movement of the bars 26, 27 with the portal, the risk of persons being crushed by the portal and workpiece can be ruled out. Due to the movement of the portal, the correctness of the transmitted images can also be checked. The correctness of the transmitted images is established by comparing the marks 25 and 24 to movement and location data from the CMM, in particular from the CMM controller. A comparison may thus be performed of the position that is ascertained using the cameras 4, 5, 10, 11 to the position which is known or specified in the CMM.

Figure 5:
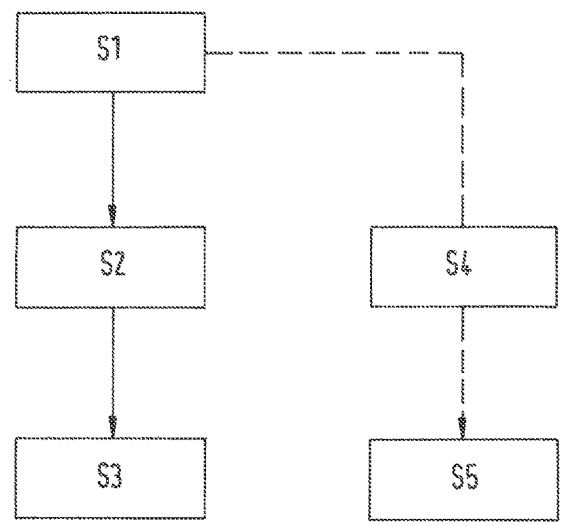
FIG. 5 shows the flowchart of a method for monitoring a CMM, wherein monitored location regions are variable in terms of their size.

FIG. 5 gives an overview of the sequences of the method or methods according to the invention that were already explained with reference to the above FIGS. 2 to 4.

The individual steps of this example show, expressed in short form:
S1: monitoring location region
S2: ascertaining the position and/or movement of the movable part
S3: setting the size of the location region
S4: determining whether a person is present in the location region
S5: controlling the movement speed of the movable part.

The sequence S1, S2, S3 represents the method with which at least one location region is monitored using the monitoring device (step S1), wherein the size of the monitored location region is variable. In step S2, the position of the movable part of the CMM relative to a fixed position associated with the location region is ascertained or how the movement of the movable part is relative to said fixed position. In step S3, the setting or changing of the size of the monitored location region is performed in dependence on which position and/or movement of the movable part, in this example of the portal 6, relative to the fixed position was ascertained. In addition, the steps S4 and S5 can be performed, wherein in step S4, it is determined whether a person is present in the location region, and in step S5, the movement speed of the movable part is controlled in dependence on the position and/or the movement of the movable part relative to the fixed position, if in step S4 the presence of a person or of an object in the monitored location region was ascertained. However, the invention generally also relates to an independent method having the steps S1, S4 and S5, i.e. to a method in which the location region does not need to be of variable size, but where the speed of the movable part according to step S5 can be controlled for a location region of constant size.

The invention claimed is:

1. A method for monitoring a coordinate-measuring machine having means for monitoring at least one location region of the coordinate-measuring machine in which a movable part of the coordinate-measuring machine is movable, wherein the method includes:
    monitoring the at least one location region with the monitoring means, wherein the monitored location region is variable in terms of its size,
    ascertaining the position of the movable part of the coordinate-measuring machine relative to a fixed position associated with the location region and/or ascertaining the movement of the movable part relative to the fixed position, and
    setting or varying the size of the monitored location region in dependence on the position and/or the movement of the movable part relative to the fixed position;
        wherein the size of the monitored location region is decreased as the distance of the movable part from the fixed position increases, and wherein a decrease of the monitored location region to zero can take place, or the size of the monitored location region is increased as the distance of the movable part from the fixed position decreases.

2. The method as claimed in claim 1, further including:
    ascertaining with the monitoring means whether a person or an object is present in the monitored location region, and
    controlling a movement of the movable part in dependence on the position and/or the movement of the movable part relative to the fixed position if the presence of a person or an object in the monitored location region is ascertained.

3. The method as claimed in claim 1, further including:
monitoring at least a side region of a base of the coordinate-measuring machine and at least one placement region of the base, in which a workpiece may be placed, wherein the side region and the placement region are part of the location region if the location region is of a corresponding size, and controlling a movement of the movable part in dependence on whether the presence of a person or of an object in the placement region and/or in the side region has been ascertained.

4. The method as claimed in claim 3, wherein the movement speed and/or acceleration of the movable part is reduced, and/or the movement direction is changed, if the presence of a person or of an object in the side region is ascertained.

5. The method as claimed in claim 1, wherein the monitoring means is used to ascertain the position and/or movement information of the movable part of the coordinate-measuring machine.

6. The method as claimed in claim 5, wherein the established position and/or the established movement information are used to monitor the controlling of the movement of the movable part.

7. The method as claimed in claim 5, wherein a comparison is effected between
the position and/or movement information established using the monitoring means, and
a position that has been established in a controller of the coordinate-measuring machine or is specified, and/or movement information that has been established in a controller of the coordinate-measuring machine or is specified.

8. The method as claimed in claim 6, wherein the movement of the movable part is controlled in dependence on a difference ascertained in the comparison or the monitoring.

9. The method as claimed in claim 1, wherein the monitoring means is set up to monitor whether a person is at a distance from the movable part that is less than a specified distance, and the movement of the movable part is changed in dependence on whether the distance is less than the specified distance.

10. The method as claimed in claim 1, wherein the monitoring means comprises at least one image recording unit.

11. A coordinate-measuring machine, including:
a base having side faces and a surface, which points upward, for holding a workpiece,
at least one movable part,
a monitoring device having at least one image recording unit,
at least one target structure, the image of which is recordable by the image recording unit, wherein the image of the target structure is variable if the target structure in the image is at least partially concealed by a person or an object, and
at least one comparison device that is set up to compare the recorded image to a comparison image, wherein the comparison image is an image in which no part of the target structure is concealed by a person or an object;
wherein the at least one target structure is/are arranged on one or more of the following: (i) on at least one side face of the base, (ii) on the surface, which faces upward, of the base, or (iii) on the movable part.

12. The coordinate-measuring machine as claimed in claim 11, wherein the target structure is a mark.

13. The coordinate-measuring machine as claimed in claim 11, having a control device that is set up for:
controlling the size of a monitored location region, and/or
controlling a movement of the movable part in dependence on a position and/or a movement of the movable part relative to a fixed position if the presence of the person or the object in the monitored location region is ascertained, and/or
controlling a movement of the movable part in dependence on whether the presence of the person or of an object in a placement region of a base of the coordinate-measuring machine and/or in the side region of a base of the coordinate-measuring machine has been ascertained.

14. The coordinate-measuring machine as claimed in claim 11, which is set up for performing the method as claimed in claim 1.

15. A method for monitoring a coordinate-measuring machine having means for monitoring at least one location region of the coordinate-measuring machine in which a movable part of the coordinate-measuring machine is movable, wherein the method includes:
monitoring the at least one location region with the monitoring means, wherein the monitored location region is variable in terms of its size,
ascertaining the position of the movable part of the coordinate-measuring machine relative to a fixed position associated with the location region and/or ascertaining the movement of the movable part relative to the fixed position,
setting or varying the size of the monitored location region in dependence on the position and/or the movement of the movable part relative to the fixed position,
monitoring at least a side region of a base of the coordinate-measuring machine and at least one placement region of the base, in which a workpiece may be placed, wherein the side region and the placement region are part of the location region if the location region is of a corresponding size, and
controlling a movement of the movable part in dependence on whether the presence of a person or of an object in the placement region and/or in the side region has been ascertained.

16. The method as claimed in claim 15, wherein the movement speed and/or acceleration of the movable part is reduced, and/or the movement direction is changed, if the presence of a person or of an object in the side region is ascertained.

* * * * *